United States Patent Office 3,428,372
Patented Feb. 18, 1969

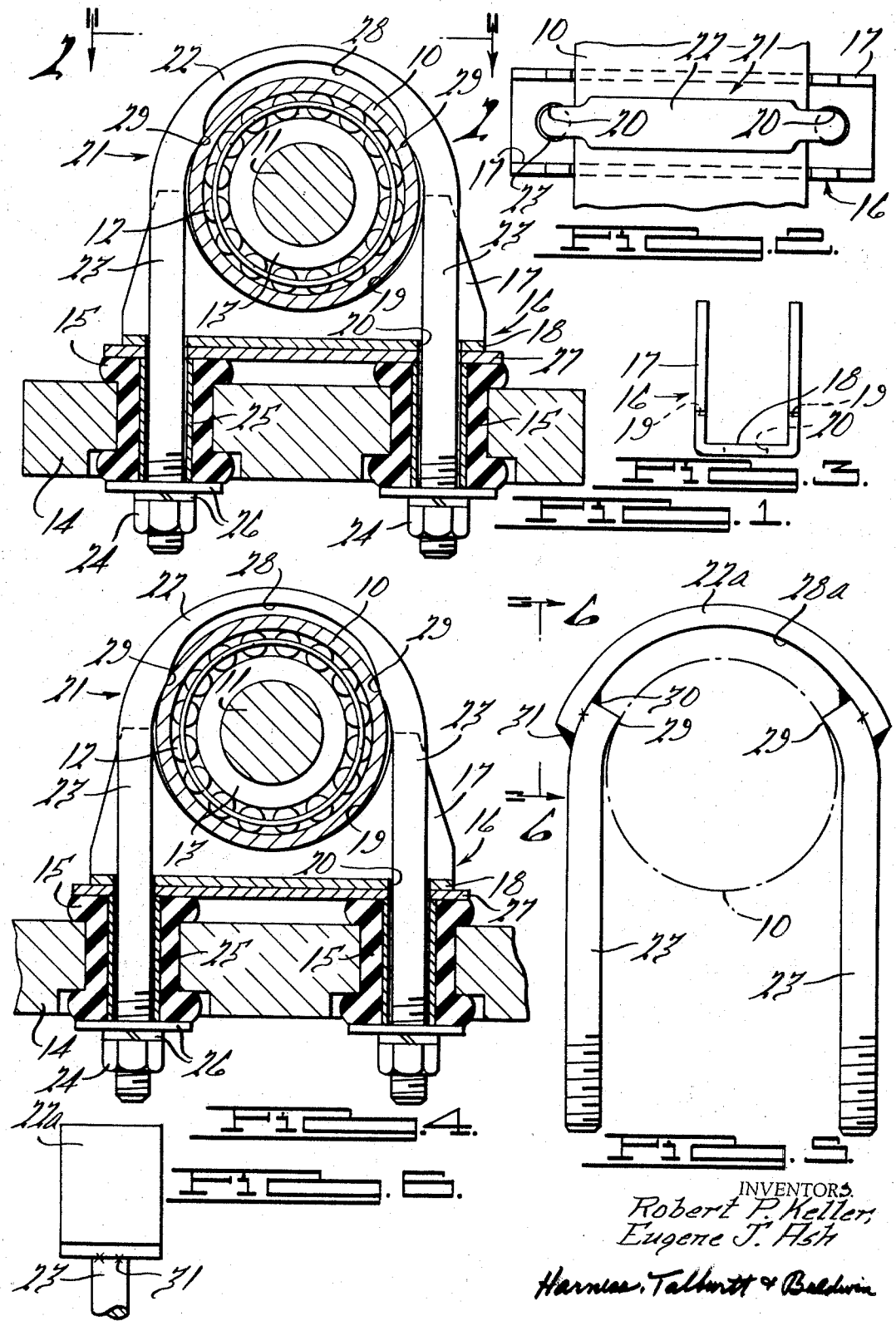

3,428,372
TUBULAR HOUSING AND SUPPORT
Robert P. Keller, Berkley, and Eugene J. Ash, Madison Heights, Mich., assignors to Chrysler Corporation, Highland Park, Mich., a corporation of Delaware
Filed Nov. 28, 1966, Ser. No. 597,393
U.S. Cl. 308—15
Int. Cl. F16c *13/00, 39/00, 35/00*
11 Claims

ABSTRACT OF THE DISCLOSURE

A resiliently yieldable thin walled circular tubular housing is claimed by means of a U-bolt against a saddle having a circular seat of greater diameter than the housing and contacting the latter at a central region of tangency, the base of the U-bolt being relieved to avoid contact with the housing except at two lateral locations spaced approximately 120° from said region of tangency.

---

This invention relates to an improved assembly comprising a cylindrical tubular housing for a bearing, seal, or the like, and means for clamping the housing to another member, such as a support, without seriously deforming the bore of the housing and binding the bearing or causing the seal to leak or otherwise impairing the function of the housing.

It has been common practice to tighten a U-bolt around a tubular housing for a rotatable shaft, such as an axle shaft or the like, to clamp the housing to a suitable support. Where the housing is subject to considerable force tending to displace it from the support, use of the desired simple and inexpensive U-bolt clamp has often not been completely satisfactory, especially if the clamp must be located in the proximity of a bearing or seal within the housing, as for example in clamping an automobile rear axle housing to the vehicle rear springs, or in clamping an automobile universal joint cross bearing cap to the universal joint drive yoke. Heretofore, tension in the U-bolt was necessarily limited to prevent flattening or distortion of the tubular housing to an out-of-round condition, such that adequate tightening of the U-bolt to clamp the housing securely to the support was frequently not feasible.

An object of the present invention is to provide an improved assembly of a bearing, for example, within a tubular housing clamped to a saddle-shaped member by a particularly simple and economically modified U-bolt of otherwise conventional construction, whereby the tubular housing is feasibly clamped securely between the U-bolt and saddle-shaped member without being flattened or deformed significantly to an out-of-round shape.

Another and more specific object is to provide such an assembly comprising a conventional saddle support and U-bolt clamp, except that the major portion of the U-base of the U-bolt is relieved to provide an arcuate space between the U-base and the tubular housing amounting to approximately 120° of arc centered with respect to an opposing region of contact between the concave saddle portion of the support when the U-bolt and saddle support are clamped to the housing, whereby the housing is tightly confined at three locations equally spaced around its periphery. By such a construction, the clamping force on the housing can be appreciably greater than has been feasible heretofore with conventional U-bolt type clamps and cannot distort the tubular housing to an out-of-round condition, unless of course the clamping force exceeds the limit required to cause localized deformation of the housing at one of its locations of clamping engagement with the U-bolt or saddle.

Other objects of this invention will appear in the following description and appended claims, reference being had to the accompanying drawings forming a part of this specification wherein like reference characters designate corresponding parts in the several views.

FIG. 1 is a transverse view through a bearing housing, showing a supporting clamp therefor embodying the present invention, the clamp being shown prior to being tightened.

FIG. 2 is a fragmentary view of the clamping elements taken in the direction of the arrows 2–2 of FIG 1.

FIG. 3 is an end view of the channel-shaped saddle support.

FIG. 4 is a view similar to FIG. 1, showing the clamp in the tightened position.

FIG. 5 is a view of a modified U-bolt embodying the present invention.

FIG. 6 is a fragmentary view taken in the direction of the arrows 6–6 of FIG. 5.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to FIGS 1–4, an embodiment of the present invention is illustrated by way of example in association with a tubular housing 10 comprising an extension of the transmission housing for an automobile gas turbine engine. The transmisison output drive shaft 11 is journalled within the housing 10 by means of a set of ball bearings 12 disposed between the inner circumference of the housing 10 and an inner annular bearing race 13 suitably mounted on the shaft 11. In the present instance, the shaft 11 and housing 10 are susceptible of excessive vibration at certain engine speeds. In order to damp such vibrations, a weight 14 carried by resilient bushings 15 is secured to a channel-shaped saddle-type support 16 to complete a base assembly firmly secured to the housing 10 as described below.

The support 16 may comprise a rigid casting or sheet metal stamping and in the present instance is formed to provide two channel sides 17 joined by an integral channel base 18. Each of the sides 17 is provided with a concave saddle 19 having a radius slightly larger than the outer radius of housing 10 to facilitate seating of the latter therein as illustrated. The channel base 18 is provided with two central bolt holes for the arms of a resilient steel U-bolt 21. The latter comprises an arcuate U-base 22 extending around the outer surface of the housing 10 in opposition to the saddle 19 and terminating in generally parallel paired arms 23, which extend through the holes 20 and bushings 25 and terminate in threaded ends having nuts 24 screwed tightly thereon to clamp the assembly together. A pair of resilient bushings 15 isolate the mass 14 from the sleeve bushings 25. Washers 26 space the nuts 24 from the bushings 15, 25. A plate 27 similarly spaces the bushings 15, 25 from the channel base 18.

Because of operational limitations, it is necessary to clamp the base assembly 16 to the housing 10 adjacent the bearing assembly 12. In the typical U-bolt type of clamp, the inner radius of both the U-bolt base and of the opposing saddle is slightly larger than the outer radius of the housing 10 to facilitate assembly of the clamp. Upon tightening of the U-bolt, the U-base of the latter and the saddle are forced into contact with the housing 10 at diametrically opposed locations midway between the and the saddle support are forced into contact with the housing 10 at diametrically opposed locations midway between the paired arms of the U-bolt. In consequence, the housing 10 is deformed to be an out-of-round flattened shape which impairs the operations of the bearing assembly 12 as well as the seal usually associated therewith.

In order to prevent such deformation, the U-bolt of the present invention is modified in a novel manner whereby the U-base 22 is relieved throughout its major circumferential extent to provide an arcurate space 28 extending circumferentially equal distances in opposite directions from the mid-point between the U-bolt arms 23 to two lateral locations of contact 29 between the U-base 22 and housing 10. The relieved portion 28 of the U-bolt base 22 is dimensioned so that when the U-bolt 21 is tightened as in FIG. 4, the contact locations 29 will be spaced approximately 120° around the periphery of the housing 10 and symmetrically with respect to the arms 23 and the clamping force. The radius of the undeformed base 22 at the contact locations 29 is slightly greater than the radius of the housing 10 prior to tightening of the U-bolt 21. Upon tightening of the U-bolt 21, the latter will yield resiliently, particularly at the region of its base 22, to provide the two locations of contact 29 of comparatively small circumferential extent and having the same radius as the housing 10. At no other place will the U-bolt 21 contact the housing 10.

In order to facilitate assembly of the housing 10 and clamp 16, space between the arms 23 is slightly greater than the outer diameter of the housing 10, which space is reduced to a minimum upon tightening of the nuts 24. The space or recess 28 in the present instance is provided by stamping or swagging a conventional U-bolt of bar steel stock in a suitable die, so as to broaden the base 22 as indicated in FIG. 2, thereby to provide the space 28 without decreasing the cross sectional area of any portion of the U-bolt or appreciably weakening the latter.

The curvature of the saddle 19 is dimensioned in accordance with conventional practice to provide a radius slightly greater than the outer radius of the housing 10 and thereby to provide a location of contact with the housing 10 of slight circumferential extent midway between the arms 23. As a result, upon tightening of the nuts 24, three equally spaced locations of contact with the housing 10, each of comparatively small circumferential extent, are arranged around the circumference of the housing 10 symmetrically with respect to the clamping forces. Accordingly, within the limits of clamping force that does not cause local deformation of the housing 10 and local bending of its sides, the housing 10 cannot be flattened to an out-of-round shape regardless of how much the nuts 24 are tightened.

The resultant action is similar to that of a bicycle wheel restrained against deformation to an out-of-round condition by uniformly spaced radial spokes. Any tendency to flatten or deform the rim of housing 10 to an out-of-round shape is transformed into circumferential rim forces, whereby the rim or housing 10, otherwise readily susceptible to flattening when clamped between two opposing forces, is rendered capable of withstanding comparatively large clamping forces directed as shown. Simple, economical means are thus provided for clamping the housing 10 firmly to the base support 16.

A modification of the invention is illustrated in FIG. 5 wherein a steel strap 22a is welded at 30 and 31 to the outer surface of the U-bolt arms 23, from which the conventional U-base has been removed between the contact locations 29. Thus a clearance 28a is provided similar in all respects to the clearance 28. The two locations of contact 29 remain as integral portions of the bolt arms 23, as in FIG. 1. In other respects, the structure and function of the modification of FIG. 5 is the same as that already described.

The two locations of contact afforded by the U-bolt readily enable uniform distribution of the clamping force thereto. Where more than two locations of support are provided, increased precision in the structure is required to achieve a uniform load distribution, so that the economics and simplicities of the present invention are lost.

Having thus described our invention, we claim:
1. In combination,
(A) a tubular housing of circular cross section deformable resiliently by diametrically opposed clamping forces to an out-of-round shape,
(B) means for firmly clamping and supporting said housing comprising
 (a) suporting means including a saddle-shaped support having
  (1) a concave supporting surface of radius not less than the outer radius of said tubular housing and
  (2) engaging an outer surface portion of the latter in supporting relation,
 (b) a resiliently yieldable U-shaped clamp having
  (1) paired arms closely straddling said housing and
  (2) an arcuate U-base enclosing an outer circumferential surface portion of said housing diametrically opposite the first named outer surface portion,
  (3) the major portion of said U-base confronting said housing being relieved to provide
   (a) an arcuate clearance between said U-base and housing extending in either circumferential direction from the portion thereof diametrically opposite said first named outer surface portion and also to provide
   (b) two locations of contact between said housing and U-base adjacent the lateral portions thereof spaced by the circumferential extent of said arcuate clearance, and
 (c) means engageable with said arms for bending said U-base from an undeformed condition and clamping the same tightly toward said housing in opposition to said concave supporting surface to effect a three location clamping engagement with said housing at only said first named outer surface portion of said housing and said two lateral portions of said U-base,
 (d) prior to assembly of said clamp with said housing and clamping of the latter between said clamp and support,
  (1) the radius of the undeformed U-base laterally of said clearance being greater than the outer radius of said housing, and
  (2) the spacing between said paired arms being slightly greater than the diameter of said housing, thereby to facilitate said assembly,
 (e) said clamp being resiliently yieldable to effect its said two locations of contact with said housing and to enable said paired arms to straddle said housing closely upon said clamping of said U-base tightly toward said housing.

2. In the combination according to claim 1, said first named outer surface portion of said housing and said two lateral portions of said U-base being spaced approximately 120° apart around the axis of said housing.

3. In the combination according to claim 1, said U-shaped clamp comprising a U-bolt screw threaded at the ends of said arms and the latter extending through said supporting means, and said means engageable with said arms including nuts screwed on the threaded ends of said arms tightly against said supporting means.

4. In the combination according to claim 1, the radius of said concave supporting surface being greater than the outer radius of said tubular housing, and said first named outer surface portion being located midway between said paired arms.

5. In the combination according to claim 4, said arcuate clearance extending approximately 60° in opposite directions about the axis of said housing from the portion thereof diametrically opposite the region of contact between said concave supporting surface and housing.

6. In the combination according to claim 5, said U-shaped clamp comprising a U-bolt having said paired arms screw threaded at their outer ends and said means engageable with said arms including nuts screwed on said outer ends against said supporting means.

7. In the combination according to claim 6, said U-bolt comprising bar stock, and the major portion of said U-base being flattened to provide said clearance.

8. In the combination according to claim 1, said first named outer surface portion of said housing and said two lateral portions of said U-base being spaced approximately 120° apart around the axis of said housing, said U-shaped clamp comprising a U-bolt screw threaded at the ends of said arms and the latter extending through said supporting means, and said means engageable with said arms including nuts screwed on the threaded ends of said arms tightly against said supporting means.

9. In the combination according to claim 8, the radius of said concave supporting surface being greater than the outer radius of said tubular housing, said first named outer surface portion being centered on a plane midway between said paired arms and said two locations of contact between said housing and U-base, said U-bolt comprising bar stock, and the major portion of said U-base being flattened to provide said clearance without decreasing the cross sectional area of said U-bolt at the region of said clearance with respect to the cross sectional area of the adjacent portions of said U-bolt.

10. In the combination according to claim 9, said housing comprising a bearing housing, a rotatable shaft extending coaxially within said housing, and means for journalling said shaft within said housing comprising annularly arranged bearing means spacing said shaft and housing.

11. In the combination according to claim 6, said housing comprising a bearing housing, a rotatable shaft extending coaxially within said housing, and means for journalling said shaft within said housing comprising annularly ararnged bearing means spacing said shaft and housing.

References Cited

UNITED STATES PATENTS

| | | | |
|---|---|---|---|
| 449,046 | 3/1891 | Lovell | 308—15 X |
| 820,883 | 5/1906 | Lea | 308—15 |
| 1,537,368 | 5/1925 | Neubert | 308—22 |
| 1,837,939 | 12/1931 | Zimmerman | 248—316.5 X |
| 2,447,852 | 8/1948 | Gartin | 308—22 |
| 2,710,235 | 6/1955 | Olsen | 308—237 X |
| 2,735,663 | 2/1956 | Holt | 248—316.3 X |
| 3,003,831 | 10/1961 | King et al. | 308—26 |
| 3,253,084 | 5/1966 | Taylor | 248—316 X |
| 3,270,994 | 9/1966 | Machan | 248—316 X |

FOREIGN PATENTS 126,526   1/1948   Sweden.

MARTIN P. SCHWADRON, *Primary Examiner.*

F. SUSKO, *Assistant Examiner.*

U.S. Cl. X.R.

308—26, 184, 189; 248—316